(12) United States Patent
Kaneko et al.

(10) Patent No.: US 12,077,145 B2
(45) Date of Patent: Sep. 3, 2024

(54) CONTROL SYSTEM AND CONTROL METHOD

(71) Applicant: Robert Bosch GmbH, Stuttgart (DE)

(72) Inventors: Shoichiro Kaneko, Kanagawa (JP); Yoshiki Takahashi, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 369 days.

(21) Appl. No.: 17/604,025

(22) PCT Filed: Apr. 14, 2020

(86) PCT No.: PCT/IB2020/053487
§ 371 (c)(1),
(2) Date: Oct. 15, 2021

(87) PCT Pub. No.: WO2020/212831
PCT Pub. Date: Oct. 22, 2020

(65) Prior Publication Data
US 2022/0194352 A1 Jun. 23, 2022

(30) Foreign Application Priority Data

Apr. 15, 2019 (JP) .................................. 2019-077212

(51) Int. Cl.
*B60W 10/22* (2006.01)
*B60W 10/06* (2006.01)

(52) U.S. Cl.
CPC ............ *B60W 10/22* (2013.01); *B60W 10/06* (2013.01); *B60W 2300/36* (2013.01); *B60W 2510/22* (2013.01); *B60W 2710/226* (2013.01)

(58) Field of Classification Search
CPC .. B60W 10/22; B60W 10/06; B60W 2300/36; B60W 2510/22;
(Continued)

(56) References Cited

U.S. PATENT DOCUMENTS

| 2009/0062069 A1* | 3/2009 | Nedachi | F16H 61/16 |
| | | | 477/97 |
| 2016/0121924 A1* | 5/2016 | Norstad | B62D 5/0481 |
| | | | 701/41 |

(Continued)

FOREIGN PATENT DOCUMENTS

| DE | 102013224712 A1 | 6/2015 |
| EP | 1930233 A2 | 6/2008 |

(Continued)

OTHER PUBLICATIONS

International Search Report and Written Opinion for Application No. PCT/IB2020/053487 dated Jul. 23, 2020 (12 pages).

*Primary Examiner* — Ig T An
(74) *Attorney, Agent, or Firm* — Michael Best & Friedrich LLP

(57) ABSTRACT

The present invention obtains a control system and a control method capable of appropriately suppressing front lift-up of a straddle-type vehicle.

In the control system and the control method according to the present invention, damping forces of suspensions and drive power generated to the straddle-type vehicle are controlled. The drive power adjustment control is executed to adjust the drive power generated to the straddle-type vehicle so as to suppress the front lift-up that causes a front wheel of the straddle-type vehicle to lift off from the ground, and initiation timing of the drive power adjustment control is controlled by using a physical quantity to which states of the suspensions are reflected.

13 Claims, 4 Drawing Sheets

(58) Field of Classification Search
CPC ........... B60W 2710/226; B60W 10/04; B60W 2422/40; B60W 30/04
See application file for complete search history.

(56) References Cited

U.S. PATENT DOCUMENTS

2016/0297428 A1* 10/2016 Moerbe ................. B60W 10/04
2018/0072286 A1* 3/2018 Hirokami .............. B60T 8/1706
2019/0126913 A1* 5/2019 Kinuhata .............. B60R 16/037

FOREIGN PATENT DOCUMENTS

| EP | 2031281 A2 | 3/2009 | |
|----|------------|--------|---|
| EP | 2551158 A1 | 1/2013 | |
| EP | 3115579 A1 | 1/2017 | |
| JP | 1930233 A2 * | 6/2008 | ......... B60G 17/0164 |
| JP | 2019019784 A | 2/2019 | |

* cited by examiner

[FIG. 1]
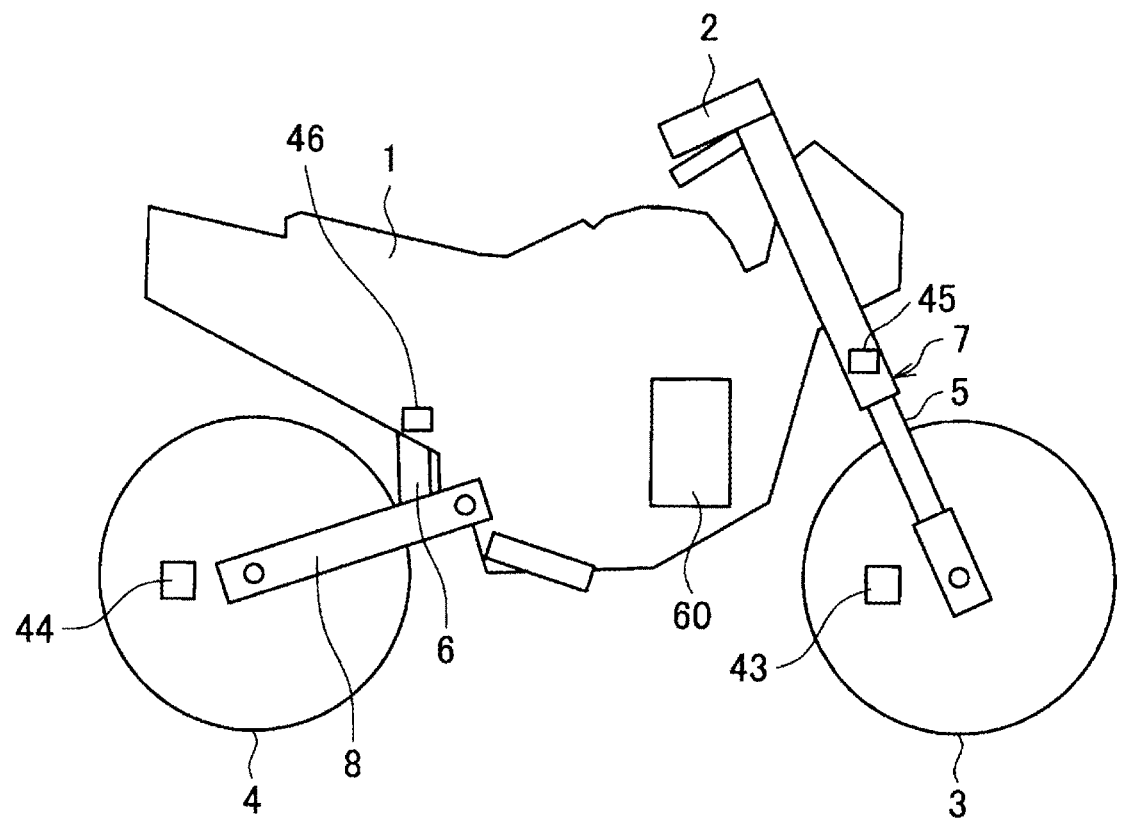

[FIG. 2]
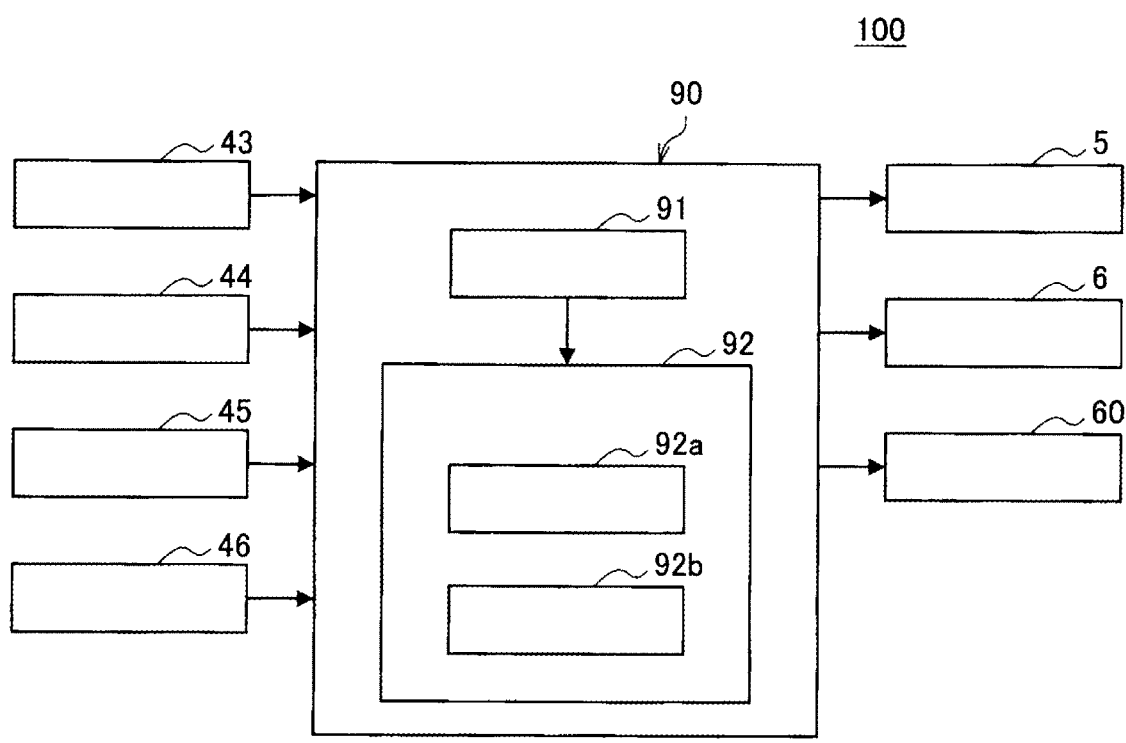

[FIG. 3]
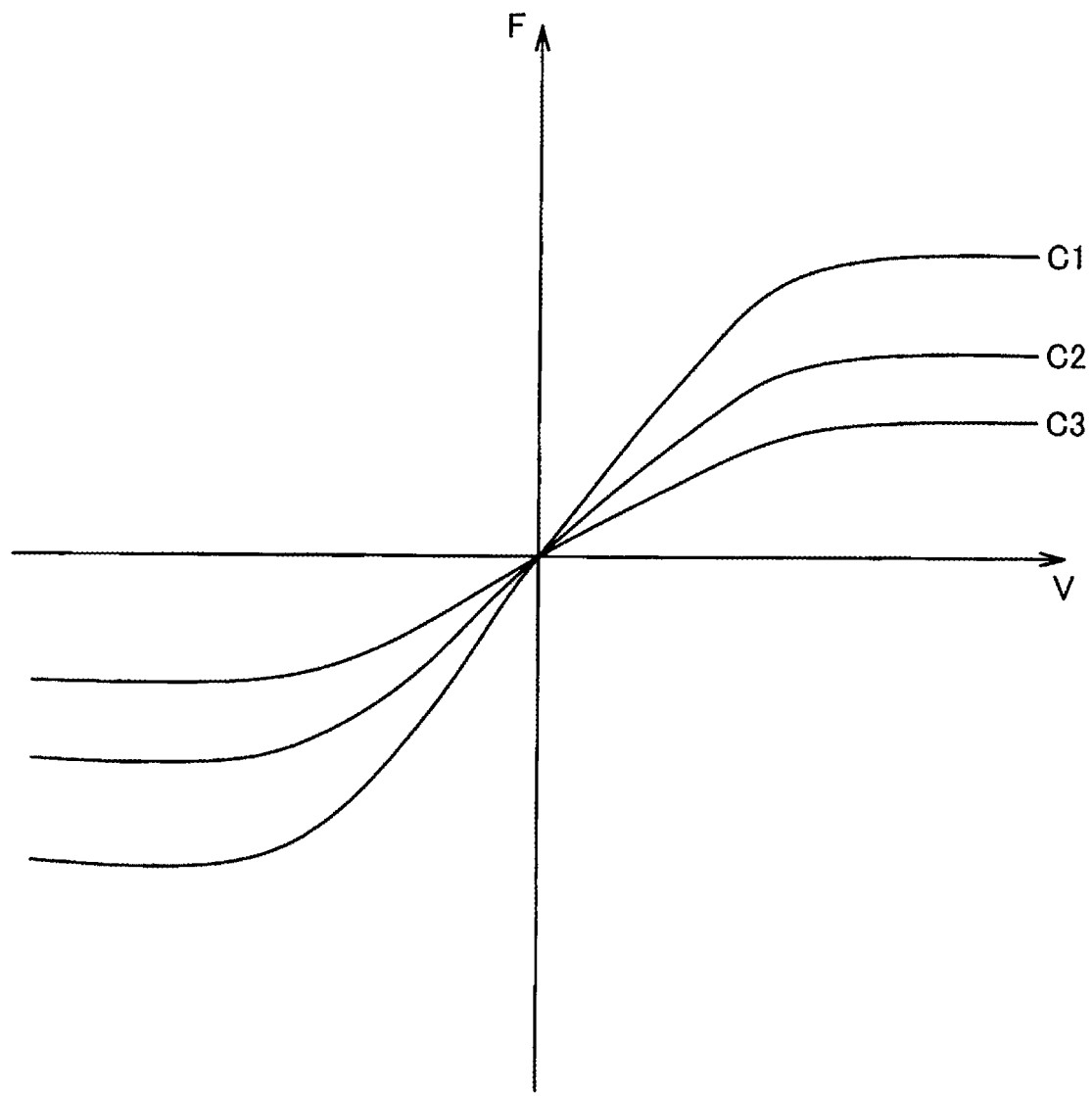

[FIG. 4]
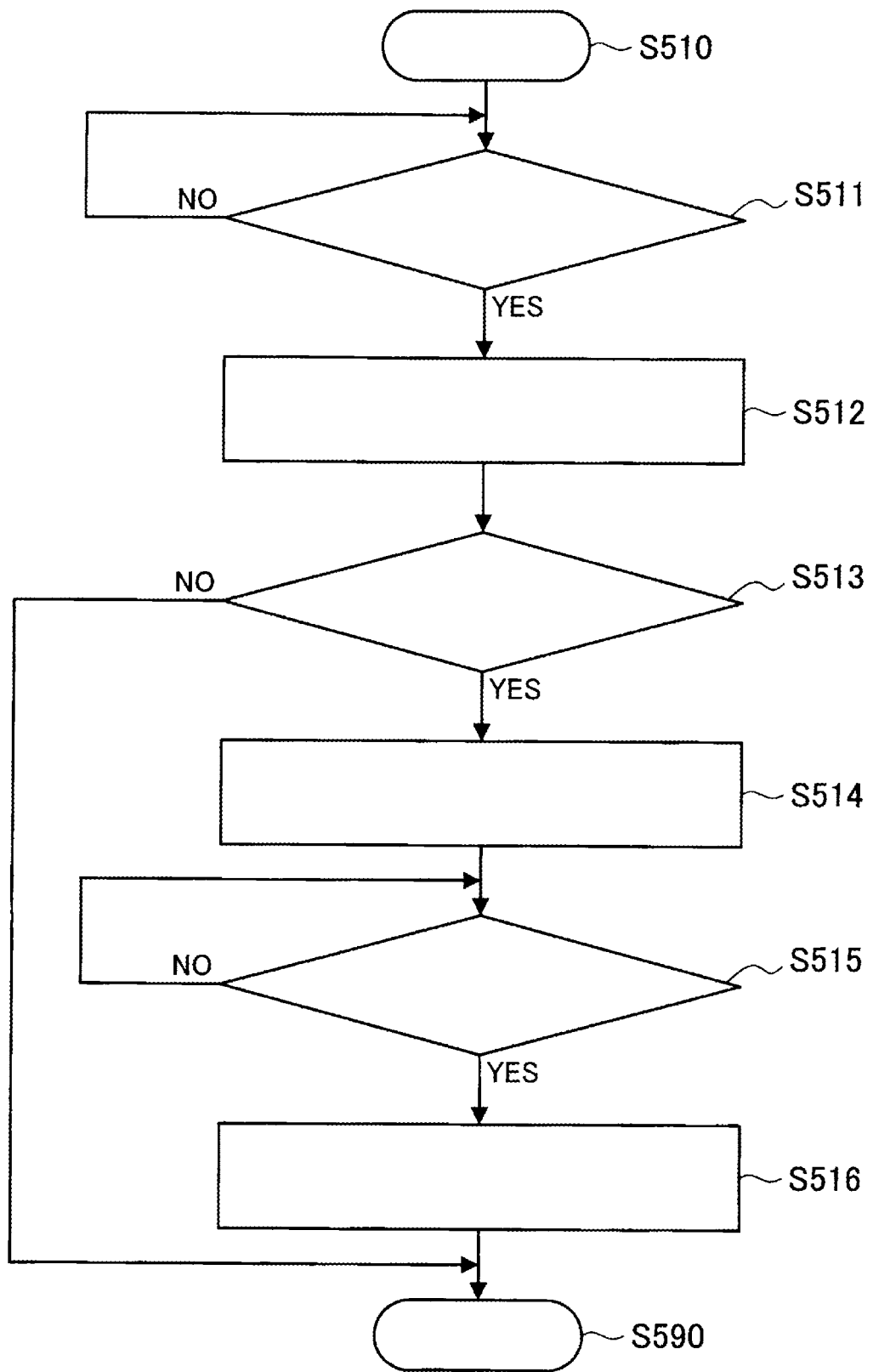

CONTROL SYSTEM AND CONTROL METHOD

BACKGROUND OF THE INVENTION

The present disclosure relates to a control system and a control method capable of appropriately suppressing front lift-up of a straddle-type vehicle.

A posture of a straddle-type vehicle such as a motorcycle tends to become unstable when compared to postures of other vehicles. Thus, when excessive drive power is generated to the straddle-type vehicle, a phenomenon called front lift-up (a phenomenon also referred to as a wheelie) that causes a front wheel to lift off from the ground possibly occurs. From a perspective of improving travel stability of the straddle-type vehicle, it is important to suppress the front lift-up. For example, as a technique of suppressing the front lift-up, as disclosed in JP-A-2019-019784, there is a technique of determining whether the front lift-up currently occurs, and adjusting the drive power generated to the straddle-type vehicle so as to suppress the front lift-up when it is determined that the front lift-up currently occurs.

By the way, in the related art such as the technique disclosed in JP-A-019784, the determination on whether the front lift-up currently occurs is frequently made by using a detection result of a wheel rotational frequency sensor. That is, initiation timing of drive power control for suppressing the front lift-up is frequently controlled by using the detection result of the wheel rotational frequency sensor. Here, the determination on the front lift-up by using the detection result of the wheel rotational frequency sensor is made on the basis of a difference between a rotational frequency of the front wheel and a rotational frequency of a rear wheel, for example. However, there is a case where there is no difference between the rotational frequency of the front wheel and the rotational frequency of the rear wheel even when the front lift-up occurs, for example. In this case, it is difficult to appropriately determine whether the front lift-up currently occurs. For this reason, in the related art, it is difficult to appropriately suppress the front lift-up.

SUMMARY OF THE INVENTION

The present invention has been made with the above-described problem as the background and therefore obtains a control system and a control method capable of appropriately suppressing front lift-up of a straddle-type vehicle.

Solution to Problem

A control system according to the present invention is a control system for controlling behavior of a straddle-type vehicle that includes suspensions, and includes a control section that controls damping forces of the suspensions and drive power generated to the straddle-type vehicle. The control section executes drive power adjustment control for adjusting the drive power generated to the straddle-type vehicle so as to suppress front lift-up that causes a front wheel of the straddle-type vehicle to lift off from the ground, and controls initiation timing of the drive power adjustment control by using a physical quantity to which states of the suspensions are reflected.

A control method according to the present invention is a control method for controlling behavior of a straddle-type vehicle that includes suspensions, and damping forces of the suspensions and drive power generated to the straddle-type vehicle are controlled by a control system. The control method includes: an execution step of executing drive power adjustment control for adjusting the drive power generated to the straddle-type vehicle so as to suppress front lift-up that causes a front wheel of the straddle-type vehicle to lift off from the ground; and an adjustment step of adjusting initiation timing of the drive power adjustment control by using a physical quantity to which states of the suspensions are reflected.

Advantageous Effects of Invention

In the control system and the control method according to the present invention, the damping forces of the suspensions and the drive power generated to the straddle-type vehicle are controlled. The drive power adjustment control is executed to adjust the drive power generated to the straddle-type vehicle so as to suppress the front lift-up that causes the front wheel of the straddle-type vehicle to lift off from the ground, and the initiation timing of the drive power adjustment control is controlled by using the physical quantity to which the states of the suspensions are reflected. As a result, it is possible to optimize the initiation timing of the drive power adjustment control, which is drive power control for suppressing the front lift-up, according to a situation of occurrence of the front lift-up (for example, a possibility of the occurrence of the front lift-up or whether the front lift-up currently occurs). Therefore, it is possible to appropriately suppress the front lift-up of the straddle-type vehicle.

BRIEF DESCRIPTION OF THE DRAWINGS

FIG. 1 is a schematic view of an outline configuration of a motorcycle to which a control system according to an embodiment of the present invention is mounted.

FIG. 2 is a block diagram of an exemplary functional configuration of the controller system according to the embodiment of the present invention.

FIG. 3 is a graph for illustrating a damping characteristic of a suspension.

FIG. 4 is a flowchart of an example of a processing procedure that is executed by the control system according to the embodiment of the present invention.

DETAILED DESCRIPTION

A description will hereinafter be made on a control system according to the present invention with reference to the drawings. Hereinafter, a description will be made on the control system used for a two-wheeled motorcycle. However, the control system according to the present invention may be used for a straddle-type vehicle other than the two-wheeled motorcycle (for example, a three-wheeled motorcycle, an all-terrain vehicle, a bicycle, or the like). The straddle-type vehicle means a vehicle that a rider straddles, and includes a scooter and the like.

In addition, a description will hereinafter be made on a case where an engine is mounted as a drive source capable of outputting power for driving motorcycle wheels. However, as the drive source for the motorcycle, a drive source other than the engine (for example, a motor) may be mounted, or a plurality of the drive sources may be mounted.

A configuration, operation, and the like, which will be described below, merely constitute one example. The control system and the control method according to the present invention are not limited to a case with such a configuration, such operation, and the like.

The same or similar description will appropriately be simplified or will not be made below. In the drawings, the same or similar members or portions will not be denoted by a reference sign or will be denoted by the same reference sign. In addition, a detailed structure will appropriately be illustrated in a simplified manner or will not be illustrated.

<Configuration of Motorcycle>

A description will be made on a configuration of a motorcycle 100 to which a control system 90 according to an embodiment of the present invention is mounted with reference to FIG. 1 to FIG. 3.

FIG. 1 is a schematic view of the outline configuration of the motorcycle 100 to which the control system 90 is mounted. FIG. 2 is a block diagram of an exemplary functional configuration of the control system 90. FIG. 3 is a graph for illustrating a damping characteristic of a suspension.

As illustrated in FIG. 1, the motorcycle 100 includes: a trunk 1; a handlebar 2 that is held by the trunk 1 in a freely turnable manner; a front wheel 3 that is held by the trunk 1 in the freely turnable manner with the handlebar 2; a rear wheel 4 that is held by the trunk 1 in a freely rotatable manner; a front suspension 5; a rear suspension 6; and an engine 60. The motorcycle 100 also includes a front-wheel rotational frequency sensor 43, a rear-wheel rotational frequency sensor 44, a front stroke sensor 45, and a rear stroke sensor 46. As illustrated in FIG. 2, the motorcycle 100 further includes the control system 90 that controls behavior of the motorcycle 100.

Each of the front suspension 5 and the rear suspension 6 corresponds to an example of the suspension of the motorcycle 100, and is interposed between the trunk 1 and the wheel. More specifically, the front suspension 5 is provided to a front fork 7 that connects the handlebar 2 and the front wheel 3, and can be extended/compressed along an axial direction of the front suspension 5. The rear suspension 6 connects the trunk 1 and a swing arm 8 that is swingably supported by the trunk 1 and holds the rear wheel 4 in the freely turnable manner, and can be extended/compressed along an axial direction of the rear suspension 6.

More specifically, each of the front suspension 5 and the rear suspension 6 includes a spring and a damper. When the spring and the damper are compressed along the axial direction of the suspension, vibrations from a road surface are absorbed, and transmission of the vibrations to a body of the motorcycle 100 is suppressed. For example, in a hydraulic oil channel that is formed in the damper of the suspension, a control valve is provided to control the damping characteristic of the suspension (more specifically, a characteristic of a damping force with respect to a stroke speed of each of the suspensions). By controlling operation of the control valve, the damping characteristic of the suspension is controlled, which further controls the damping force of the suspension.

The damping characteristic of the suspension may be controlled by a method other than the above (for example, a method for controlling a magnetic field produced in the damper by using a magnetic fluid as the hydraulic oil in the damper of the suspension).

The front stroke sensor 45 detects a stroke amount of the front suspension 5 and outputs a detection result. The front stroke sensor 45 may detect another physical quantity (for example, stroke acceleration of the front suspension 5, a force applied to the front suspension 5, or the like) that can substantially be converted to the stroke amount of the front suspension 5. The front stroke sensor 45 is provided to the front suspension 5, for example.

The rear stroke sensor 46 detects a stroke amount of the rear suspension 6 and outputs a detection result. The rear stroke sensor 46 may detect another physical quantity (for example, stroke acceleration of the rear suspension 6, a force applied to the rear suspension 6, or the like) that can substantially be converted to the stroke amount of the rear suspension 6. The rear stroke sensor 46 is provided to the rear suspension 6, for example.

The engine 60 corresponds to an example of a drive source for the motorcycle 100, and can output power for driving the wheel (for example, the rear wheel 4). For example, the engine 60 is provided with: one or multiple cylinders, each of which is formed with a combustion chamber therein; a fuel injector that injects fuel into the combustion chamber; and an ignition plug. When the fuel is injected from the fuel injector, air-fuel mixture containing air and the fuel is produced in the combustion chamber, and the air-fuel mixture is then ignited by the ignition plug and burned. Consequently, a piston provided in the cylinder reciprocates to cause rotation of a crankshaft. A throttle valve is provided in an intake pipe of the engine 60, and an intake air amount for the combustion chamber varies in accordance with a throttle opening amount as an opening amount of the throttle valve.

The front-wheel rotational frequency sensor 43 is a rotational frequency sensor that detects a rotational frequency of the front wheel 3 (for example, a rotational frequency of the front wheel 3 per unit time [rpm], a travel distance per unit time [km/h], or the like), and outputs a detection result. The front-wheel rotational frequency sensor 43 may detect another physical quantity that can substantially be converted to the rotational frequency of the front wheel 3. The front-wheel rotational frequency sensor 43 is provided to the front wheel 3.

The rear-wheel rotational frequency sensor 44 is a rotational frequency sensor that detects a rotational frequency of the rear wheel 4 (for example, the rotational frequency of the rear wheel 4 per unit time [rpm], a travel distance per unit time [km/h], or the like), and outputs a detection result. The rear-wheel rotational frequency sensor 44 may detect another physical quantity that can substantially be converted to the rotational frequency of the rear wheel 4. The rear-wheel rotational frequency sensor 44 is provided to the rear wheel 4.

The control system 90 controls operation of each device in the motorcycle 100, so as to control the behavior of the motorcycle 100.

The control system 90 may be formed of a single controller or may be formed of multiple controllers. The controller that constitutes the control system 90 may partially or entirely be constructed of a microcomputer, a microprocessor unit, or the like, may be constructed of a member in which firmware or the like can be updated, or may be a program module or the like that is executed by a command from a CPU or the like, for example.

As illustrated in FIG. 2, the control system 90 includes an acquisition section 91 and a control section 92, for example. In the case where the control system 90 is formed of the multiple controllers, functional sections that are the acquisition section 91 and the control section 92 may be provided in the single controller or may separately be provided in the multiple controllers. For example, a suspension control section 92a and a drive control section 92b, which will be described later, may separately be provided in the different controllers.

The acquisition section 91 acquires information that is output from each of the devices mounted to the motorcycle 100, and outputs the acquired information to the control section 92. For example, the acquisition section 91 acquires the information output from the front-wheel rotational frequency sensor 43, the rear-wheel rotational frequency sensor 44, the front stroke sensor 45, and the rear stroke sensor 46.

The control section 92 controls the damping forces of the suspensions in the motorcycle 100 and drive power generated to the motorcycle 100. The control section 92 includes the suspension control section 92a and the drive control section 92b, for example.

The suspension control section 92a controls the damping characteristics of the front suspension 5 and the rear suspension 6, and thereby controls the damping forces of the front suspension 5 and the rear suspension 6.

More specifically, the damping force of each of the suspensions is generated in a direction that corresponds to the positive or negative stroke speed (that is, a stroke direction of each of the suspensions). In general, a magnitude (an absolute value) of the damping force of the suspension is increased as a magnitude (an absolute value) of the stroke speed is increased. For example, FIG. 3 exemplifies damping characteristics C1, C2, C3 as the damping characteristics of the suspension. FIG. 3 illustrates each of the damping characteristics with a stroke speed V on a horizontal axis and a damping force F on a vertical axis.

In the example illustrated in FIG. 3, the magnitudes of the damping forces generated at the same stroke speed are sequentially reduced in an order of the damping characteristics C1, C2, C3. Thus, for example, by changing the damping characteristic of the suspension from the damping characteristic C2 to the damping characteristic C1, the damping force of the suspension can be increased (that is, the suspension can be hardened). Meanwhile, by changing the damping characteristic of the suspension from the damping characteristic C2 to the damping characteristic C3, the damping force of the suspension can be reduced (that is, the suspension can be softened). In order to facilitate understanding, FIG. 3 illustrates the three damping characteristics in a discrete manner. However, the damping characteristic of each of the front suspension 5 and the rear suspension 6 may be continuously changeable.

More specifically, the suspension control section 92a controls the damping forces of the front suspension 5 and the rear suspension 6 so as to suppress pitching of the motorcycle 100 (that is, a change in a posture of the motorcycle 100 in a direction in which the motorcycle 100 rotates about an axis in a vehicle right-left direction). For example, the suspension control section 92a controls the damping forces of the front suspension 5 and the rear suspension 6 by using the stroke amount of the front suspension 5 detected by the front stroke sensor 45 and the stroke amount of the rear suspension 6 detected by the rear stroke sensor 46. In this way, the suspension control section 92a can suppress the pitching of the motorcycle 100. In detail, the suspension control section 92a hardens the front suspension 5 and the rear suspension 6 as the pitching of the motorcycle 100 is increased, for example. In this way, the suspension control section 92a can suppress the pitching of the motorcycle 100.

The drive control section 92b controls the drive power generated to the motorcycle 100 by controlling operation of each of the devices (the throttle valve, the fuel injector, the ignition plug, and the like) in the engine 60.

In a normal time, the drive control section 92b controls the operation of each of the devices in the engine 60 such that the drive power corresponding to an accelerator operation by a rider (more specifically, an operation to twist an accelerator grip on the handlebar 2) is generated to the motorcycle 100. Meanwhile, under a particular situation, the drive control section 92b executes control for adjusting the drive power generated to the motorcycle 100 from the drive power corresponding to the accelerator operation by the rider.

For example, the drive control section 92b controls the operation of the throttle valve in the engine 60 so as to reduce the throttle opening amount. In this way, the drive control section 92b can reduce the intake air amount and thereby reduce the drive power to be transmitted to the wheel. In addition, for example, the drive control section 92b controls the operation of the throttle valve in the engine 60 so as to increase the throttle opening amount. In this way, the drive control section 92b can increase the intake air amount and thereby increase the drive power to be transmitted to the wheel.

As the control for adjusting the drive power generated to the motorcycle 100 from the drive power corresponding to the accelerator operation by the rider, the drive control section 92b executes traction control for suppressing a wheel slip during acceleration of the motorcycle 100, for example.

For example, when a slip rate (that is, a value that is obtained by dividing a difference between a vehicle speed and the wheel rotational frequency by the vehicle speed) of a drive wheel (for example, the rear wheel 4) exceeds a reference slip rate during the acceleration of the motorcycle 100, the drive control section 92b executes the traction control. Here, the reference slip rate is a value set such that it is possible to appropriately determine whether the slip rate is high enough to cause locking or possible locking of the drive wheel, and can appropriately be set according to a specification of the vehicle. For example, the drive control section 92b can estimate the slip rate by using the front-wheel rotational frequency sensor 43 and the rear-wheel rotational frequency sensor 44, for example. In the traction control, the drive control section 92b reduces the drive power to be generated on the drive wheel.

Here, as the control for adjusting the drive power generated to the motorcycle 100 from the drive power corresponding to the accelerator operation by the rider, the drive control section 92b executes drive power adjustment control for adjusting the drive power generated to the motorcycle 100 so as to suppress front lift-up that causes the front wheel 3 to lift off from the ground.

For example, in the drive power adjustment control, the drive control section 92b reduces the drive power generated to the motorcycle 100 to be lower than the drive power before initiation of the drive power adjustment control. As described above, the front lift-up occurs when the excessive drive power is generated to the motorcycle 100. By reducing the drive power generated to the motorcycle 100 to be lower than the drive power before the initiation of the drive power adjustment control, it is possible to effectively suppress the generation of the excessive drive power to the motorcycle 100. Therefore, the front lift-up can effectively be suppressed.

In addition, for example, in the drive power adjustment control, the drive control section 92b maintains the drive power generated to the motorcycle 100 to a lower value than reference drive power. More specifically, the reference drive power is set to the drive power, generation of which is anticipated when the front lift-up occurs in a process of increasing the drive power generated to the motorcycle 100. By maintaining the drive power generated to the motorcycle 100 to the lower value than the reference drive power, it is possible to suppress the excessive drive power from being generated to the motorcycle 100 while suppressing the drive power generated to the motorcycle 100 from becoming excessively low. Therefore, it is possible to suppress deterioration of acceleration performance of the motorcycle 100 while suppressing the front lift-up.

As described above, in the control system 90, the control section 92 executes the drive power adjustment control for adjusting the drive power generated to the motorcycle 100 so as to suppress the front lift-up. The control section 92 controls initiation timing of the drive power adjustment control by using the physical quantity to which the states of the suspensions of the motorcycle 100 are reflected. In this way, the front lift-up of the motorcycle 100 is appropriately suppressed. A detailed description will be made later on processing that is related to such control for suppressing the front lift-up and that is executed by the control system 90.

<Operation of Control System>

A description will be made on operation of the control system 90 according to the embodiment of the present invention with reference to FIG. 4.

FIG. 4 is a flowchart of an example of a processing procedure that is executed by the control system 90. More specifically, the control flow illustrated in FIG. 4 corresponds to a processing procedure related to the control that is executed by the control section 92 in the control system 90 to suppress the front lift-up, and is repeatedly executed. In addition, step S510 and step S590 in FIG. 4 respectively correspond to initiation and termination of the control flow illustrated in FIG. 4.

When the control flow illustrated in FIG. 4 is initiated, in step S511, the control section 92 determines whether a possibility of the occurrence of the front lift-up is higher than a reference. If it is determined that the possibility of the occurrence of the front lift-up is higher than the reference (step S511/YES), the processing proceeds to step S512. On the other hand, if it is determined that possibility of the occurrence of the front lift-up is equal to or lower than the reference (step S511/NO), the processing in step S511 is repeated.

More specifically, the control section 92 determines the possibility of the occurrence of the front lift-up on the basis of the physical quantity to which the states of the suspensions of the motorcycle 100 are reflected. Here, the possibility of the occurrence of the front lift-up varies according to the posture in a pitch direction of the motorcycle 100, and the posture in the pitch direction of the motorcycle 100 varies according to the states of the suspensions. Thus, by determining the possibility of the occurrence of the front lift-up on the basis of the physical quantity to which the states of the suspensions are reflected, it is possible to appropriately determine the possibility of the occurrence of the front lift-up according to the posture in the pitch direction of the motorcycle 100.

Here, from a perspective of further appropriately determining the possibility of the occurrence of the front lift-up, the control section 92 preferably determines the possibility of the occurrence of the front lift-up on the basis of the physical quantity, to which the stroke amounts of the suspensions are reflected, as the states of the suspensions of the motorcycle 100. For example, the control section 92 can determine the possibility of the occurrence of the front lift-up by using, as such a physical quantity, the stroke amount of the front suspension 5 detected by the front stroke sensor 45 and the stroke amount of the rear suspension 6 detected by the rear stroke sensor 46.

In detail, for example, in the case where the front suspension 5 continues being extended while the stroke amount of the rear suspension 6 is maintained, the control section 92 determines that there is the possibility of the occurrence of the front lift-up. Furthermore, in the case where the stroke speed of the front suspension 5 is high, the control section 92 can determine that the possibility of the occurrence of the front lift-up is high.

In addition, from the perspective of further appropriately determining the possibility of the occurrence of the front lift-up, the control section 92 preferably determines the possibility of the occurrence of the front lift-up by using a position of a center of gravity of the motorcycle 100 as the physical quantity to which the stroke amounts of the suspensions of the motorcycle 100 are reflected. For example, the control section 92 estimates the position of the center of gravity of the motorcycle 100 on the basis of the stroke amount of the front suspension 5 detected by the front stroke sensor 45 and the stroke amount of the rear suspension 6 detected by the rear stroke sensor 46, and can thereby determine the possibility of the occurrence of the front lift-up by using the estimated position of the center of gravity.

In detail, moment of a force around the rear wheel 4 that is generated by own weight of the motorcycle 100 varies according to the position of the center of gravity of the motorcycle 100. Here, the possibility of the occurrence of the front lift-up varies according to the moment of the force around the rear wheel 4 that is generated by the own weight of the motorcycle 100. Thus, by determining the possibility of the occurrence of the front lift-up by using the position of the center of gravity of the motorcycle 100, it is possible to appropriately determine the possibility of the occurrence of the front lift-up according to the moment of the force around the rear wheel 4 that is generated by the own weight of the motorcycle 100.

The reference that is used to determine whether the possibility of the occurrence of the front lift-up is higher than the reference can appropriately be set in consideration of a balance between a perspective of improving reliability of suppressing the front lift-up and a perspective of lowering a frequency of unnecessary execution of the control for suppressing the front lift-up. More specifically, as the reference used for the above determination is set lower, the effect of improving the reliability of suppressing the front lift-up is increased, and the frequency of the unnecessary execution of the control for suppressing the front lift-up is also increased. On the contrary, as the reference used for the above determination is set higher, the effect of improving the reliability of suppressing the front lift-up is reduced, and the frequency of the unnecessary execution of the control for suppressing the front lift-up is also reduced.

If it is determined YES in step S511, in step S512, the control section 92 executes damping force adjustment control. The damping force adjustment control is control for adjusting the damping forces of the suspensions so as to suppress the front lift-up.

For example, the control section 92 softens the front suspension 5 in the damping force adjustment control. As a result, the front wheel 3 can easily follow the contour of the ground, and thus can contribute to body stability. However, the damping force adjustment control is not particularly limited to the above example. For example, depending on a situation, the front lift-up may be suppressed by hardening the front suspension 5. In such a case, the front suspension 5 may be hardened in the damping force adjustment control.

Next, in step S513, the control section 92 determines whether the possibility of the occurrence of the front lift-up is higher than the reference. If it is determined that the possibility of the occurrence of the front lift-up is higher than the reference (step S513/YES), the processing proceeds to step S514. On the other hand, if it is determined that the possibility of the occurrence of the front lift-up is equal to or lower than the reference (step S513/NO), the control flow illustrated in FIG. 4 is terminated.

More specifically, similar to step S511, the control section 92 determines the possibility of the occurrence of the front lift-up on the basis of the physical quantity to which the states of the suspensions of the motorcycle 100 are reflected.

The reference that is used to determine whether the possibility of the occurrence of the front lift-up is higher than the reference can appropriately be set in consideration of the balance between the perspective of improving the reliability of suppressing the front lift-up and the perspective of lowering the frequency of the unnecessary execution of the control for suppressing the front lift-up. The reference used for the determination in step S513 may be set to be equal to or near the reference used for the determination in step S511, or may differ from (for example, may be higher than) the reference used for the determination in step S511.

If it is determined YES in step S513, in step S514, the control section 92 initiates the drive power adjustment control. As described above, the drive power adjustment control is the control for adjusting the drive power generated to the motorcycle 100 so as to suppress the front lift-up.

Just as described, the control section 92 controls the initiation timing of the drive power adjustment control by using the physical quantity to which the states of the suspensions of the motorcycle 100 are reflected. As a result, compared to a case where the initiation timing of the drive power adjustment control is controlled by using the detection results of the wheel rotational frequency sensors such as the front-wheel rotational frequency sensor 43 and the rear-wheel rotational frequency sensor 44, it is possible to optimize the initiation timing of the drive power adjustment control, which is the drive power control for suppressing the front lift-up, according to a situation of the occurrence of the front lift-up (for example, in the control flow illustrated in FIG. 4, the possibility of the occurrence of the front lift-up).

For example, as described above, in the control flow illustrated in FIG. 4, the control section 92 determines the possibility of the occurrence of the front lift-up on the basis of the physical quantity to which the states of the suspensions of the motorcycle 100 are reflected. Then, when determining that the possibility of the occurrence of the front lift-up is higher than the reference, the control section 92 initiates the drive power adjustment control. In this way, it is possible to initiate the drive power adjustment control after appropriately determining that the possibility of the occurrence of the front lift-up is higher than the reference.

However, the initiation timing of the drive power adjustment control, which is controlled by using the physical quantity to which the states of the suspensions of the motorcycle 100 are reflected, is not particularly limited to the above example. For example, the control section 92 may determine whether the front lift-up currently occurs on the basis of the physical quantity to which the states of the suspensions of the motorcycle 100 are reflected. Then, when determining that the front lift-up currently occurs, the control section 92 may initiate the drive power adjustment control.

The posture in the pitch direction of the motorcycle 100 differs between the case where the front lift-up occurs and the case where the front lift-up does not occur. The posture in the pitch direction of the motorcycle 100 varies according to the states of the suspensions. Thus, by determining whether the front lift-up occurs on the basis of the physical quantity to which the states of the suspensions are reflected, it is possible to appropriately determine whether the front lift-up occurs according to the posture in the pitch direction of the motorcycle 100. That is, it is determined whether the front lift-up currently occurs on the basis of the physical quantity to which the states of the suspensions of the motorcycle 100 are reflected. Then, in the case where it is determined that the front lift-up currently occurs, the drive power adjustment control is initiated. In this way, it is possible to initiate the drive power adjustment control after appropriately determining that the front lift-up currently occurs.

Here, from a perspective of appropriately suppressing the front lift-up by the drive power adjustment control, the control section 92 preferably controls a degree of a change in the drive power in the drive power adjustment control by using the physical quantity to which the states of the suspensions of the motorcycle 100 are reflected. For example, it is possible to appropriately suppress the front lift-up by the drive power adjustment control when the degree of the change in the drive power (for example, a reduced amount of the drive power) in the drive power adjustment control is increased as the possibility of the occurrence of the front lift-up that is determined on the basis of the above physical quantity is increased.

Next, in step S515, the control section 92 determines whether the possibility of the occurrence of the front lift-up is lower than the reference. If it is determined that the possibility of the occurrence of the front lift-up is lower than the reference (step S515/YES), the processing proceeds to step S516. On the other hand, if it is determined that possibility of the occurrence of the front lift-up is equal to or higher than the reference (step S515/NO), the processing in step S515 is repeated.

More specifically, similar to step S511, the control section 92 determines the possibility of the occurrence of the front lift-up on the basis of the physical quantity to which the states of the suspensions of the motorcycle 100 are reflected.

The reference that is used to determine whether the possibility of the occurrence of the front lift-up is lower than the reference can appropriately be set in consideration of a balance between the perspective of improving the reliability of suppressing the front lift-up and a perspective of suppressing unnecessary continuation of the control for suppressing the front lift-up. More specifically, as the reference used for the above determination is set lower, the effect of improving the reliability of suppressing the front lift-up is increased, and an effect of suppressing the unnecessary continuation of the control for suppressing the front lift-up is reduced. On the contrary, as the reference used for the above determination is set higher, the effect of improving the reliability of suppressing the front lift-up is reduced, and the effect of suppressing the unnecessary continuation of the control for suppressing the front lift-up is increased. The reference used for the determination in step S515 may be set to be equal to or near the reference used for the determination in step S511 or step S513, or may differ from the reference used for the determination in step S511 or step S513.

If it is determined YES in step S515, in step S516, the control section 92 terminates the drive power adjustment control.

Just as described, the control section 92 preferably controls the termination timing of the drive power adjustment control by using the physical quantity to which the states of the suspensions of the motorcycle 100 are reflected. As a result, compared to a case where the termination timing of the drive power adjustment control is controlled by using the detection results of the wheel rotational frequency sensors such as the front-wheel rotational frequency sensor 43 and the rear-wheel rotational frequency sensor 44, it is possible to optimize the termination timing of the drive power adjustment control, which is the drive power control for suppressing the front lift-up, according to the situation of the occurrence of the front lift-up (for example, in the control flow illustrated in FIG. 4, the possibility of the occurrence of the front lift-up). In this way, it is possible to further appropriately suppress the front lift-up of the motorcycle 100.

For example, as described above, in the control flow illustrated in FIG. 4, the control section 92 determines the possibility of the occurrence of the front lift-up on the basis of the physical quantity to which the states of the suspensions of the motorcycle 100 are reflected. Then, when determining that the possibility of the occurrence of the front lift-up is lower than the reference, the control section 92 terminates the drive power adjustment control. In this way, it is possible to terminate the drive power adjustment control after appropriately determining that the possibility of the occurrence of the front lift-up is lower than the reference.

However, the termination timing of the drive power adjustment control, which is controlled by using the physical quantity to which the states of the suspensions of the motorcycle 100 are reflected, is not particularly limited to the above example. For example, the control section 92 may determine whether the front lift-up currently occurs on the basis of the physical quantity to which the states of the suspensions of the motorcycle 100 are reflected. Then, when determining that the front lift-up does not currently occur, the control section 92 may terminate the drive power adjustment control. In this way, it is possible to terminate the drive power adjustment control after appropriately determining that the front lift-up does not currently occur.

Next, the control flow illustrated in FIG. 4 is terminated.

As described above, in the control flow illustrated in FIG. 4, the control section 92 determines the possibility of the occurrence of the front lift-up on the basis of the physical quantity to which the states of the suspensions of the motorcycle 100 are reflected. Then, when determining that the possibility of the occurrence of the front lift-up is higher than the reference, the control section 92 executes the damping force adjustment control prior to the initiation of the drive power adjustment control. As a result, it is possible to avoid the execution of the drive power adjustment control under a situation where the front lift-up can sufficiently be suppressed by the damping force adjustment control. Therefore, it is possible to suppress the deterioration of the acceleration performance of the motorcycle 100 caused by the execution of the drive power adjustment control.

<Effects of Control System>

A description will be made on effects of the control system 90 according to the embodiment of the present invention.

The control system 90 includes the control section 92 that controls the damping forces of the suspensions of the motorcycle 100 and the drive power generated to the motorcycle 100. The control section 92 executes the drive power adjustment control for adjusting the drive power generated to the motorcycle 100 so as to suppress the front lift-up that causes the front wheel 3 of the motorcycle 100 to lift off from the ground. The control section 92 controls the initiation timing of the drive power adjustment control by using the physical quantity to which the states of the suspensions of the motorcycle 100 are reflected. As a result, compared to the case where the initiation timing of the drive power adjustment control is controlled by using the detection results of the wheel rotational frequency sensors such as the front-wheel rotational frequency sensor 43 and the rear-wheel rotational frequency sensor 44, it is possible to optimize the initiation timing of the drive power adjustment control, which is the drive power control for suppressing the front lift-up, according to the situation of the occurrence of the front lift-up (for example, the possibility of the occurrence of the front lift-up or whether the front lift-up currently occurs). In this way, it is possible to appropriately suppress the front lift-up of the motorcycle 100.

Preferably, the control section 92 in the control system 90 determines the possibility of the occurrence of the front lift-up on the basis of the physical quantity to which the states of the suspensions of the motorcycle 100 are reflected. Then, when determining that the possibility of the occurrence of the front lift-up is higher than the reference, the control section 92 initiates the drive power adjustment control. In this way, it is possible to initiate the drive power adjustment control after appropriately determining that the possibility of the occurrence of the front lift-up is higher than the reference. Therefore, it is possible to appropriately suppress the front lift-up of the motorcycle 100 in advance.

Preferably, the control section 92 in the control system 90 determines whether the front lift-up currently occurs on the basis of the physical quantity to which the states of the suspensions of the motorcycle 100 are reflected. Then, when determining that the front lift-up currently occurs, the control section 92 initiates the drive power adjustment control. In this way, it is possible to initiate the drive power adjustment control after appropriately determining that the front lift-up currently occurs. Therefore, it is possible to appropriately suppress the front lift-up of the motorcycle 100 while suppressing the deterioration of the acceleration performance of the motorcycle 100 caused by the execution of the drive power adjustment control.

Preferably, the control section 92 in the control system 90 determines the possibility of the occurrence of the front lift-up on the basis of the physical quantity to which the states of the suspensions of the motorcycle 100 are reflected. Then, when determining that the possibility of the occurrence of the front lift-up is higher than the reference, prior to the initiation of the drive power adjustment control, the control section 92 executes the damping force adjustment control for adjusting the damping forces of the suspensions so as to suppress the front lift-up. In this way, it is possible to avoid the execution of the drive power adjustment control under the situation where the front lift-up can sufficiently be suppressed by the damping force adjustment control. Therefore, it is possible to suppress the deterioration of the acceleration performance of the motorcycle 100 caused by the execution of the drive power adjustment control. Meanwhile, under a situation where it is difficult to sufficiently suppress the front lift-up by the damping force adjustment control, the drive power adjustment control is executed. In this way, it is possible to appropriately suppress the front lift-up.

Preferably, the control section 92 in the control system 90 controls the termination timing of the drive power adjustment control by using the physical quantity to which the states of the suspensions of the motorcycle 100 are reflected. In this way, compared to the case where the termination timing of the drive power adjustment control is controlled by using the detection results of the wheel rotational frequency sensors such as the front-wheel rotational frequency sensor 43 and the rear-wheel rotational frequency sensor 44, it is possible to optimize the termination timing of the drive power adjustment control, which is the drive power control for suppressing the front lift-up, according to the situation of the occurrence of the front lift-up. Therefore, it is possible to further appropriately suppress the front lift-up of the motorcycle 100.

Preferably, the control section 92 in the control system 90 determines the possibility of the occurrence of the front lift-up on the basis of the physical quantity to which the states of the suspensions of the motorcycle 100 are reflected. Then, when determining that the possibility of the occurrence of the front lift-up is lower than the reference, the control section 92 terminates the drive power adjustment control. In this way, it is possible to terminate the drive power adjustment control after appropriately determining that the possibility of the occurrence of the front lift-up is lower than the reference. Therefore, it is possible to further effectively suppress the front lift-up of the motorcycle 100.

Preferably, the control section 92 in the control system 90 determines whether the front lift-up currently occurs on the basis of the physical quantity to which the states of the suspensions of the motorcycle 100 are reflected. Then, when determining that the front lift-up does not currently occur, the control section 92 terminates the drive power adjustment control. In this way, it is possible to terminate the drive power adjustment control after appropriately determining that the front lift-up does not currently occur. Therefore, it is possible to appropriately suppress the front lift-up of the motorcycle 100 while suppressing the deterioration of the acceleration performance of the motorcycle 100 caused by the execution of the drive power adjustment control.

Preferably, the control section 92 in the control system 90 controls the degree of the change in the drive power in the drive power adjustment control by using the physical quantity to which the states of the suspensions of the motorcycle 100 are reflected. In this way, it is possible to optimize the degree of the change in the drive power in the drive power adjustment control according to the situation of the occurrence of the front lift-up. Therefore, it is possible to appropriately suppress the front lift-up by the drive power adjustment control.

Preferably, in the control system 90, the stroke amounts of the suspensions of the motorcycle 100 are reflected to the physical quantity. In this way, as described above, it is possible to further appropriately determine the situation of the occurrence of the front lift-up (for example, in the control flow illustrated in FIG. 4, the possibility of the occurrence of the front lift-up). Therefore, by controlling the initiation timing of the drive power adjustment control by using the physical quantity to which the stroke amounts of the suspensions of the motorcycle 100 are reflected, it is possible to appropriately optimize the initiation timing of the drive power adjustment control according to the situation of the occurrence of the front lift-up.

Preferably, in the control system 90, the physical quantity is the position of the center of gravity of the motorcycle 100. In this way, as described above, it is possible to further appropriately determine the situation of the occurrence of the front lift-up (for example, in the control flow illustrated in FIG. 4, the possibility of the occurrence of the front lift-up). Therefore, by controlling the initiation timing of the drive power adjustment control by using the position of the center of gravity of the motorcycle 100 as the physical quantity to which the stroke amounts of the suspensions of the motorcycle 100 are reflected, it is possible to further appropriately optimize the initiation timing of the drive power adjustment control according to the situation of the occurrence of the front lift-up.

Preferably, in the drive power adjustment control, the control section 92 in the control system 90 reduces the drive power generated to the motorcycle 100 to be lower than the drive power before the initiation of the drive power adjustment control. In this way, it is possible to effectively suppress the generation of the excessive drive power to the motorcycle 100. Therefore, the front lift-up can effectively be suppressed.

Preferably, in the drive power adjustment control, the control section 92 in the control system 90 maintains the drive power generated to the motorcycle 100 to the lower value than the reference drive power. In this way, it is possible to suppress the generation of the excessive drive power to the motorcycle 100 while suppressing the drive power generated to the motorcycle 100 from becoming excessively low. Therefore, it is possible to suppress the deterioration of the acceleration performance of the motorcycle 100 while suppressing the front lift-up.

The present invention is not limited to each of the embodiments. For example, all or parts of the embodiments may be combined, or only a part of each of the embodiments may be implemented.

REFERENCE SIGNS LIST

1: Trunk
2: Handlebar
3: Front wheel
4: Rear wheel
5: Front suspension
6: Rear suspension
7: Front fork
8: Swing arm
43: Front-wheel rotational frequency sensor
44: Rear-wheel rotational frequency sensor
45: Front stroke sensor
46: Rear stroke sensor
60: Engine
90: Control system
91: Acquisition section
92: Control section
92*a*: Suspension control section
92*b*: Drive control section
100: Motorcycle

The invention claimed is:

1. A control system (90) for controlling behavior of a straddle-type vehicle (100) that includes suspensions (5, 6), the control system comprising:
  a control section (92) that controls damping forces of the suspensions (5, 6) and drive power generated to the straddle-type vehicle (100), wherein
  the control section (92)
    in response to determining that a possibility of occurrence of front lift-up that causes a front wheel (3) of the straddle-type vehicle (100) to lift off from the ground is higher than a reference, execute damping force adjustment control for adjusting damping forces of the suspensions (5, 6) so as to suppress the front lift-up,
    after executing damping force adjustment control, initiate drive power adjustment control for adjusting the drive power generated to the straddle-type vehicle (100) so as to suppress the front lift-up, and controls initiation timing of the drive power adjustment control by using a measured characteristic of the suspensions (5, 6).

2. The control system according to claim 1, wherein the control section (92)
  determines a possibility of occurrence of the front lift-up on the basis of the measured characteristic, and
  initiates the drive power adjustment control when determining that the possibility of the occurrence of the front lift-up is higher than the reference.

3. The control system according to claim 1, wherein the control section (92)
  determines whether the front lift-up currently occurs on the basis of the measured characteristic, and
  initiates the drive power adjustment control when determining that the front lift-up currently occurs.

4. The control system according to claim 2, wherein the control section (92)
  determines the possibility of the occurrence of the front lift-up on the basis of the measured characteristic, and
  executes damping force adjustment control when determining that the possibility of the occurrence of the front lift-up is higher than the reference.

5. The control system according to claim 1, wherein the control section (92) controls termination timing of the drive power adjustment control by using the measured characteristic.

6. The control system according to claim 5, wherein the control section (92)
  determines the possibility of the occurrence of the front lift-up on the basis of the measured characteristic, and
  terminates the drive power adjustment control when determining that the possibility of the occurrence of the front lift-up is lower than the reference.

7. The control system according to claim 5, wherein the control section (92)
  determines whether the front lift-up currently occurs on the basis of the measured characteristic, and
  terminates the drive power adjustment control when determining that the front lift-up does not currently occur.

8. The control system according to claim 1, wherein the control section (92) controls a degree of a change in the drive power in the drive power adjustment control by using the measured characteristic.

9. The control system according to claim 1, wherein stroke amounts of the suspensions (5, 6) are reflected to the measured characteristic.

10. The control system according to claim 9, wherein the measured characteristic is a position of a center of gravity of the straddle-type vehicle (100).

11. The control system according to claim 1, wherein in the drive power adjustment control, the control section (92) reduces the drive power generated to the straddle-type vehicle (100) to be lower than the drive power before the initiation of the drive power adjustment control.

12. The control system according to claim 1, wherein in the drive power adjustment control, the control section (92) maintains the drive power generated to the straddle-type vehicle (100) to a lower value than reference drive power.

13. A control method for controlling behavior of a straddle-type vehicle (100) that includes suspensions (5, 6), and
  damping forces of the suspensions (5, 6) and drive power generated to the straddle-type vehicle (100) being controlled by a control system (90), the control method comprising:
  in response to determining that a possibility of occurrence of front lift-up that causes a front wheel (3) of the straddle-type vehicle (100) to lift off from the ground is higher than a reference, executing damping force adjustment control for adjusting damping forces of the suspensions (5, 6) so as to suppress the front lift-up;
  after executing damping force adjustment control, executing drive power adjustment control for adjusting the drive power generated to the straddle-type vehicle (100) so as to suppress front lift-up; and
  adjusting initiation timing of the drive power adjustment control by using a measured characteristic of the suspensions (5, 6).

* * * * *